US012203290B2

(12) United States Patent
Holmes et al.

(10) Patent No.: US 12,203,290 B2
(45) Date of Patent: *Jan. 21, 2025

(54) MODULAR CLUTCHING MECHANISM

(71) Applicant: Schlage Lock Company LLC, Carmel, IN (US)

(72) Inventors: Douglas A. Holmes, Golden, CO (US); Kenton H. Barker, Colorado Springs, CO (US); Aditya S. Heblikar, Ballari (IN); Nagesh Varadaraju, Bangalore (IN); Vijayakumar Mani, Bangalore (IN); Preethi M. Yogaraj, Bangalore (IN); Adithya G. Shetty, Mangalore (IN); Sushanth Kondi, Bangalore (IN)

(73) Assignee: Schlage Lock Company LLC, Carmel, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/239,492

(22) Filed: Aug. 29, 2023

(65) Prior Publication Data

US 2024/0200363 A1 Jun. 20, 2024

Related U.S. Application Data

(63) Continuation of application No. 16/990,429, filed on Aug. 11, 2020, now Pat. No. 11,739,562, which is a (Continued)

(51) Int. Cl.

*E05B 47/06* (2006.01)
*E05B 47/00* (2006.01)

(52) U.S. Cl.

CPC ...... *E05B 47/0692* (2013.01); *E05B 47/0012* (2013.01); *E05B 2047/002* (2013.01); *E05B 2047/0026* (2013.01)

(58) Field of Classification Search

CPC ............ E05B 47/0692; E05B 47/0012; E05B 2047/002; E05B 2047/0026; E05B 47/00; (Continued)

(56) References Cited

U.S. PATENT DOCUMENTS

| | | |
|---|---|---|
| 4,073,527 A | 2/1978 | Schlage |
| 5,474,348 A | 12/1995 | Palmer et al. |

(Continued)

FOREIGN PATENT DOCUMENTS

| | | |
|---|---|---|
| CN | 102041921 A | 5/2011 |
| CN | 205314684 U | 6/2016 |

(Continued)

OTHER PUBLICATIONS

Australian Examination Report; IP Australia; Australian Application No. 2019309370; Jun. 6, 2024; 4 pages.

(Continued)

*Primary Examiner* — Suzanne L Barrett
(74) *Attorney, Agent, or Firm* — Taft Stettinius & Hollister LLP

(57) ABSTRACT

An exemplary clutch mechanism includes a casing, first and second hubs rotatably mounted to the casing, an electrically-actuated drive assembly mounted within the casing, and a clutching lug movably mounted within the casing. The lug has an engaged position in which the lug couples the hubs for joint rotation and a disengaged position in which the hubs are rotationally decoupled. The drive assembly is operable to drive the lug between the engaged and disengaged positions to couple and decouple the hubs. The clutch mechanism is modular and self-contained within the casing such that the mechanism can be installed to each of a plurality of different lockset products without opening the casing.

20 Claims, 8 Drawing Sheets

Related U.S. Application Data continuation of application No. 16/043,844, filed on Jul. 24, 2018, now Pat. No. 10,738,506.

(58) Field of Classification Search

CPC ............. E05B 63/08; E05B 2047/0017; E05B 2047/0031; E05B 47/0661; E05B 2047/0001; E05B 55/005; E05B 9/00; E05B 63/044; Y10T 70/8324; Y10T 70/5832; Y10T 292/1021

USPC ............................................................ 70/472

See application file for complete search history.

(56) References Cited

U.S. PATENT DOCUMENTS

| | | | | |
|---|---|---|---|---|
| 5,628,216 | A | 5/1997 | Qureshi et al. | |
| 5,884,515 | A | 3/1999 | Milman | |
| 6,354,121 | B1 | 3/2002 | Frolov | |
| 6,487,884 | B1 | 12/2002 | Constantinou | |
| 7,007,526 | B2 | 3/2006 | Frolov et al. | |
| 7,069,755 | B2 | 7/2006 | Lies et al. | |
| 7,096,698 | B2 | 8/2006 | Walsh, III et al. | |
| 7,168,276 | B2 | 1/2007 | Errani et al. | |
| 8,783,076 | B2 | 7/2014 | Schwenk et al. | |
| 9,217,264 | B2 | 12/2015 | Milton-Benoit et al. | |
| 9,670,696 | B2 | 6/2017 | Chong | |
| 9,803,394 | B2 | 10/2017 | Frolov et al. | |
| 10,738,506 | B2 * | 8/2020 | Holmes | E05B 47/0012 |
| 11,739,562 | B2 * | 8/2023 | Holmes | E05B 47/0012 70/472 |
| 2002/0144526 | A1 | 10/2002 | Chih | |
| 2005/0144994 | A1 | 7/2005 | Lies et al. | |
| 2005/0284200 | A1 | 12/2005 | Moon et al. | |
| 2006/0112747 | A1 | 6/2006 | Moon et al. | |
| 2009/0025438 | A1 | 1/2009 | Don et al. | |
| 2009/0027197 | A1 | 1/2009 | Frolov | |
| 2010/0011822 | A1 | 1/2010 | Ocana | |
| 2010/0031713 | A1 | 2/2010 | Brown et al. | |
| 2010/0263418 | A1 | 10/2010 | Moon | |
| 2012/0013135 | A1 | 1/2012 | Moon | |
| 2012/0198897 | A1 | 8/2012 | Lui | |
| 2012/0267903 | A1 | 10/2012 | Welsby et al. | |
| 2016/0258189 | A1 | 9/2016 | Frolov | |
| 2017/0016252 | A1 | 1/2017 | Uhlmann | |
| 2017/0122007 | A1 | 5/2017 | Moon et al. | |
| 2017/0342740 | A1 | 11/2017 | Basavaraju et al. | |

FOREIGN PATENT DOCUMENTS

| | | | |
|---|---|---|---|
| CN | 106320815 | A | 1/2017 |
| EP | 2397627 | A2 | 12/2011 |
| EP | 2754794 | A2 | 7/2014 |
| KR | 20090120132 | A | 11/2009 |
| WO | 2010130850 | A1 | 11/2011 |

OTHER PUBLICATIONS

Australian Examination Report; IP Australia; Australian Application No. 2019309370; Jul. 4, 2024; 3 pages.

Examination Report; Canadian Intellectual Property Office; Canadian Patent Application No. 3,111,502; Dec. 1, 2023; 4 pages.

Extended European Search Report; European Patent Office; European Patent Application No. 19840265.3; Aug. 8, 2022; 14 pages.

Canadian Examination Report; Canadian Intellectual Property Office; Canadian Patent Application No. 3,111,502; Feb. 24, 2022; 5 pages.

International Search Report; International Searching Authority; International Application No. PCT/US2019/043263; Nov. 4, 2019; 2 pages.

Written Opinion of the International Searching Authority; International Searching Authority; International Application No. PCT/US2019/043263; Nov. 4, 2019; 5 pages.

Chinese Office Action; National Intellectual Property Administration, People's Republic of China; Chinese Patent Application No. 201980062840.1; Sep. 15, 2021; 8 pages.

Canadian Examination Report; Canadian Intellectual Property Office; Canadian Application No. 3,111,502; Mar. 2, 2023; 5 pages.

New Zealand Examination Report; New Zealand Intellectual Property Office; New Zealand Application No. 773273; Sep. 25, 2024; 3 pages.

* cited by examiner

MODULAR CLUTCHING MECHANISM

CROSS REFERENCE TO RELATED APPLICATIONS

The present application is a continuation of U.S. patent application Ser. No. 16/990,429 filed Aug. 11, 2020 and issued as U.S. Pat. No. 11,739,562, which is a continuation of U.S. patent application Ser. No. 16/043,844 filed Jul. 24, 2018 and issued as U.S. Pat. No. 10,738,506, the contents of each application are incorporated herein by reference in their entirety.

TECHNICAL FIELD

The present disclosure generally relates to locksets, and more particularly but not exclusively relates to clutching mechanisms for such locksets.

BACKGROUND

Certain locksets include clutching mechanisms which selectively couple a manual actuator with a retraction member such that the actuator is selectively operable to retract a bolt. Some such clutching mechanisms have certain limitations, such as those related to compatibility with other forms and formats of locks. For example, a clutching mechanism designed for use with one form or format of lockset may be incompatible with another form or format of lockset. For these reasons among others, there remains a need for further improvements in this technological field.

SUMMARY

An exemplary clutch mechanism includes a casing, first and second hubs rotatably mounted to the casing, an electrically-actuated drive assembly mounted within the casing, and a clutching lug movably mounted within the casing. The lug has an engaged position in which the lug couples the hubs for joint rotation and a disengaged position in which the hubs are rotationally decoupled. The drive assembly is operable to drive the lug between the engaged and disengaged positions to couple and decouple the hubs. The clutch mechanism is modular and self-contained within the casing such that the mechanism can be installed to each of a plurality of different lockset products without opening the casing. Further embodiments, forms, features, and aspects of the present application shall become apparent from the description and figures provided herewith.

DETAILED DESCRIPTION OF ILLUSTRATIVE EMBODIMENTS

Figure 1:
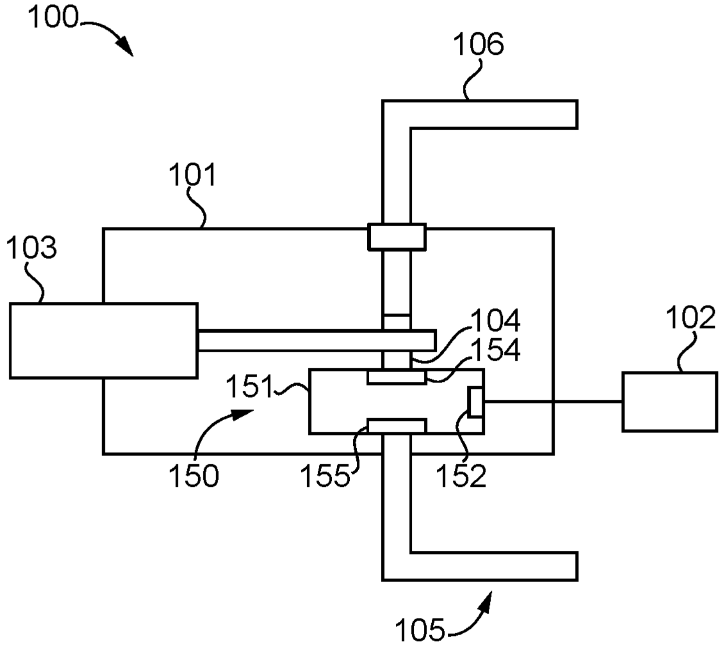
FIG. 1 is a schematic representation of a lockset including a clutch mechanism according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

With reference to FIG. 1, illustrated therein is a schematic representation of a lockset 100 including a modular clutch mechanism 150 according to certain embodiments. The lockset 100 includes a housing assembly 101 and includes or is in communication with an access controller 102. The lockset 100 further includes an extendible and retractable bolt 103, a retraction member 104 operably coupled with the bolt 103 such that rotation of the retraction member 104 causes the bolt 103 to extend and retract, and an outer manual actuator 105 rotatably mounted to the housing assembly 101. While the bolt 103 is schematically illustrated as being mounted to the same portion of the housing assembly 101 as the actuator 105, it is to be appreciated that the bolt 103 may be mounted elsewhere, such as to a different housing member of the housing assembly 101. As described herein, the clutch mechanism 150 is configured to selectively couple the outer actuator 105 with the retraction member 104 based on signals from the access controller 102 such that the outer actuator 105 is selectively operable to retract and/or extend the bolt 103. The lockset 100 may further include an inner manual actuator 106 operable to move the bolt 103, for example by rotating the retraction member 104.

The clutch mechanism 150 is a modular unit that is self-contained within a case 151, which is mounted within the housing assembly 101 of the lockset 100. In certain forms, the case 151 may be secured in a closed configuration using releasable fasteners such as screws, for example to facilitate opening of the case. As described herein, however, the clutch mechanism 150 is capable of being installed to and removed from the lockset 100 without opening the case 151. Thus, in certain forms, the case 151 may be secured in a closed configuration with permanent fastening members, such as rivets or a permanent adhesive.

The clutch mechanism 150 is secured to the housing assembly 101 and has three points of operative connection with the working components of the lockset 100. More particularly, the clutch mechanism 150 includes an electrical connector 152 by which the clutch mechanism 150 is in communication with the access controller 102, an inner hub 154 rotationally coupled with the retraction member 104, and an outer hub 155 rotationally coupled with the outer actuator 105. The clutch mechanism 150 is configured to selectively couple the hubs 154, 155 for joint rotation based on signals received via the electrical connector 152 such that the outer actuator 105 is selectively operable to retract the bolt 103.

Each of the hubs 154, 155 is rotatably mounted to the case 151, and is configured for connection with at least one of the outer actuator 105 or the retraction member 104. For example, each hub 154, 155 may have an opening that is non-circular about the rotational axis of the hubs 154, 155, and is thereby able to couple with a corresponding geometry on the rotatable member (i.e., the retractor 104 or the actuator 105). In certain embodiments, the coupling features may be the same as one another such that the clutch mechanism 150 is reversible. For example, each of the retractor 104 and the actuator 105 may have a square-shaped protrusion, and each of the hubs 154, 155 may include a square-shaped opening such that each hub 154, 155 is capable of mating engagement with both the retractor 104 and the actuator 105. In other forms, the coupling features may be different from one another to facilitate installation of the clutch mechanism 150 in a selected orientation while discouraging or preventing installation of the clutch mechanism in a non-selected orientation.

Figure 2:
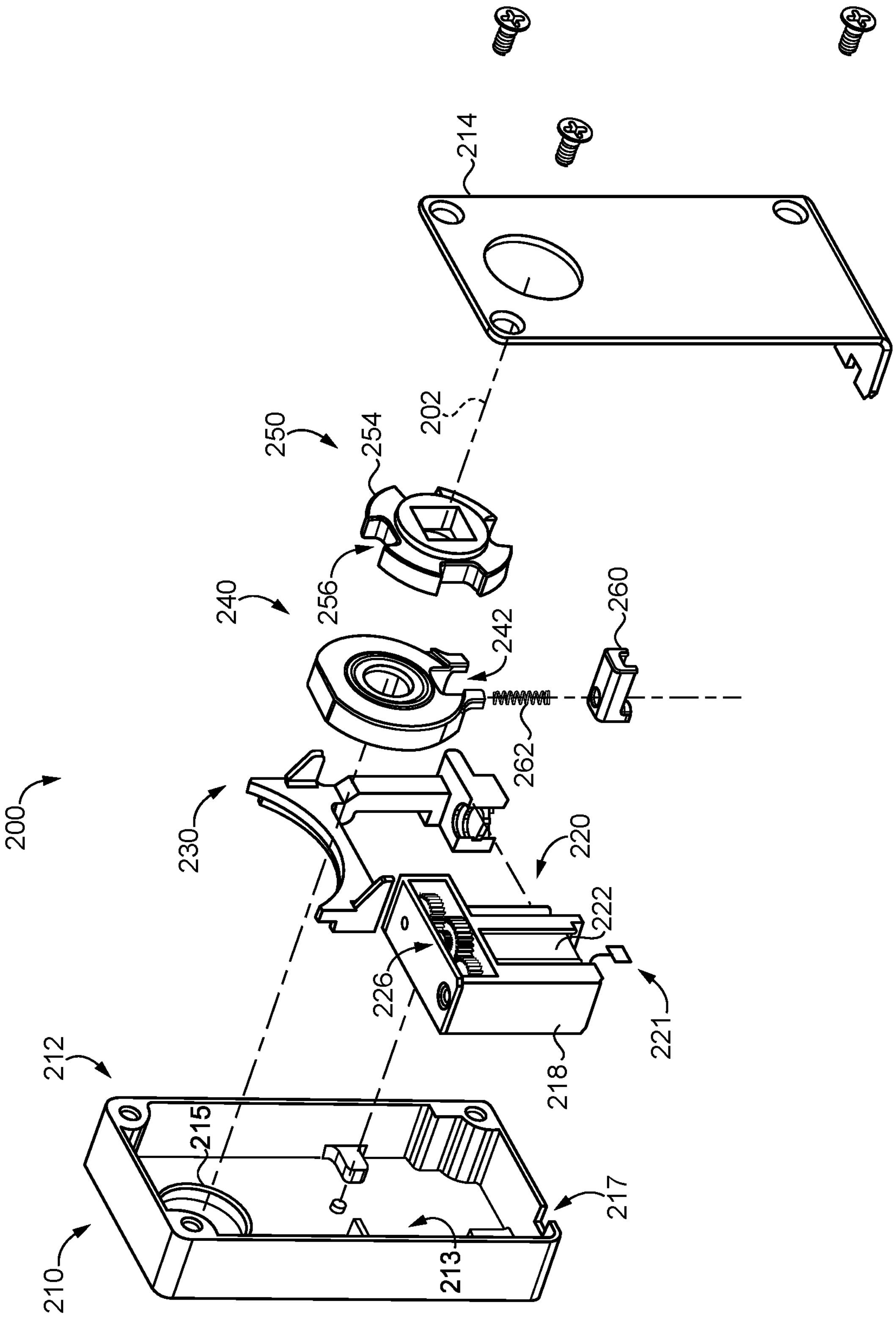
FIG. 2 is an exploded assembly view of a clutch mechanism according to certain embodiments.

With additional reference to FIG. 2, illustrated therein is a modular clutching mechanism 200 according to certain embodiments, which is an example of the above-described modular clutching mechanism 150. The clutching mechanism 200 is provided as a modular unit that is self-contained within a case 210. As described herein, the case 210 is configured to be mounted in each of a plurality of different assemblies that can be associated with the clutching mechanism 200. The clutching mechanism 200 generally includes the case 210, a drive assembly 220 mounted in the case 210, a moving wall 230 driven by the drive assembly 220, first and second hubs 240, 250 mounted for independent rotation relative to the case 210, and a clutching lug 260 operable to selectively couple the hubs 240, 250 for joint rotation about a rotational axis 202.

The case 210 includes a housing 212 that houses the internal components of the clutching mechanism 200, and a cover 214 that aids in retaining the internal components within the case 210. The housing 212 defines a chamber 213, and includes an annular boss 215 on which the first hub 240 is rotatably mounted. An internal housing 218 is mounted in the chamber 213 and movably supports the drive assembly 220.

Figure 4:
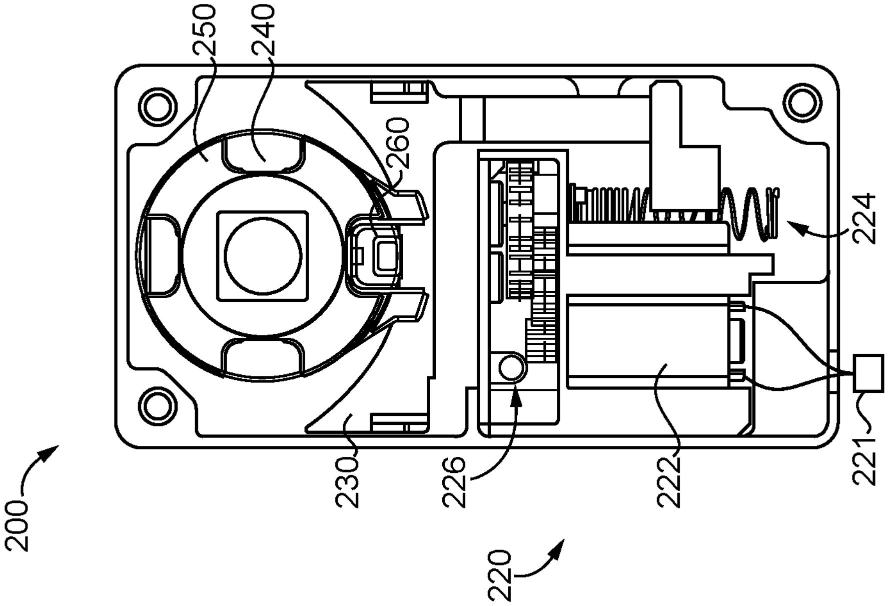
FIG. 4 is a plan view of the clutch mechanism illustrated in FIG. 2 while in an unlocked or coupling state.
Figure 3:
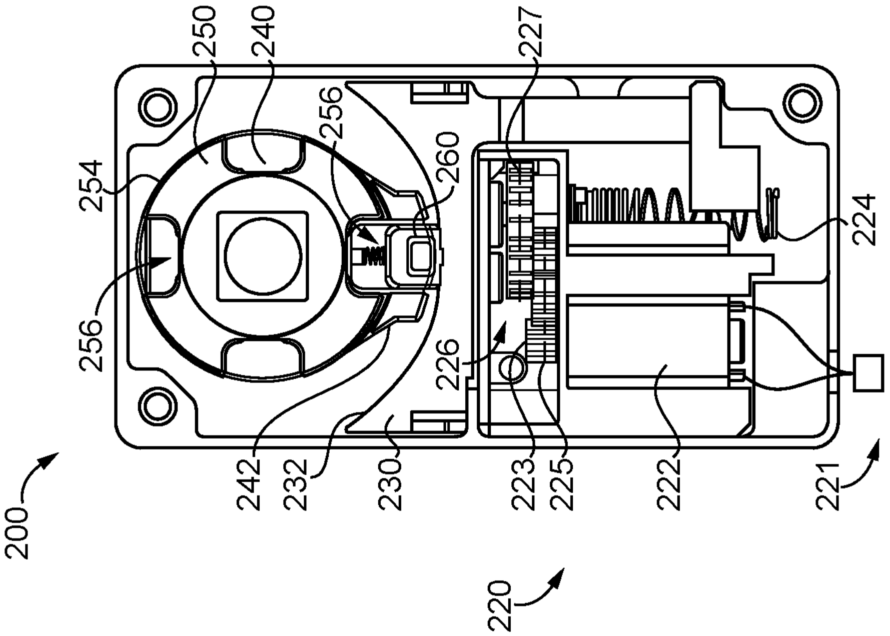
FIG. 3 is a plan view of the clutch mechanism illustrated in FIG. 2 while in a locked or decoupling state.

With additional reference to FIGS. 3 and 4, the drive assembly 220 includes a motor 222 having a motor shaft 223 that is connected to a coil spring 224 via a reduction gear set 226. The reduction gear set 226 includes an input gear 225 mounted to the motor shaft 223, an output gear 227 to which the coil spring 224 is coupled for joint rotation, and one or more intermediate gears connecting the input gear 225 with the output gear 227 such that the output gear 227 rotates at a lower speed than the input gear 225. An electrical connector 221 is connected with terminals of the motor 222 and is accessible via an opening 217 in the case 210. For example, the connector 221 may include wires that extend through the opening 217. The motor 222 is configured to rotate the motor shaft 223 in response to signals received via the connector 221, and the reduction gear set 226 translates rotation of the motor shaft 223 to rotation of the coil spring 224.

The moving wall 230 is slidably mounted in the case 210, and is engaged with the coils of the spring 224 such that the coil spring 224 urges the wall 230 to move linearly as the coil spring 224 is rotated by the motor 222. The wall 230 has an arcuate support surface 232 that is engaged with and supports the clutching lug 260. In certain forms, the wall 230 may be considered to be included in the drive assembly 220.

Each of the hubs 240, 250 is rotatably mounted to the case 151, and is configured for connection with at least one of the outer actuator 105 or the retraction member 104. In the illustrated form, the coupling features are the same such that the orientation of the clutching mechanism 200 is reversible within the lockset 100. In one orientation, the first hub 240 is the inner hub 154 and is coupled with the retractor 104, and the second hub 250 is the outer hub 155 and is coupled with the actuator 105. In the opposite second orientation, the first hub 240 is the outer hub 155 and is coupled with the actuator 105, and the second hub 250 is the inner hub 154 and is coupled with the retractor 104. While certain descriptions herein may be made with reference to the first orientation, it is to be appreciated that analogous features and functions would occur with the clutch mechanism 200 installed in the second orientation.

The first hub 240 includes a pair of radial prongs 242, and the clutching lug 260 is received between the prongs 242 such that the lug 260 pivots about the rotational axis 202 of the first hub 240 as the hub 240 rotates. The second hub 250 includes a circular radially outer surface 254 that is interrupted by one or more notches 256, each of which is sized and shaped to receive the clutching lug 260. Each of the hubs 240, 250 is mounted for rotation about the rotational axis 202, and has a fixed position along the rotational axis 202.

The clutching lug 260 is positioned between the prongs 242 and is movably supported by the arcuate support surface 232. A spring 262 is engaged between the hub 240 and the lug 260, and biases the lug 260 toward a radially outward disengaged position. With the lug 260 in the disengaged position (FIG. 3), the lug 260 is not received in any of the notches 256, and the second hub 250 is free to rotate with respect to the first hub 240. As described herein, when the lug 260 is driven to its engaged position (FIG. 4), the lug 260 is received in one of the notches 256 and couples the hubs 240, 250 for joint rotation.

When installed to the lockset 100, the modular clutch mechanism 200 is mounted in the outer housing 101, and has three points of operational engagement with the working components of the lockset 100. More specifically, the motor 222 is in communication with the access controller 102 via the electrical connector 152/221, the inner first hub 154/240 is rotationally coupled with the retraction member 104, and the outer second hub 155/250 is rotationally coupled with the outer actuator 105.

The access controller 102 is configured to transmit signals to which the motor 222 is responsive. In certain forms, the access controller 102 may be mounted on or adjacent the door. For example, and the access controller 102 may comprise a credential reader, may transmit a first signal when an appropriate credential is read, and may transmit a second signal a predetermined amount of time after transmitting the first signal. In certain forms, the access controller 102 may be included in the lockset 100, while in other forms the access controller 102 may be a remote access controller that transmits signals from a remote location.

Operation of the lockset 100 may begin with the clutch mechanism 200 in the decoupling state illustrated in FIG. 3. In this state, the lug 260 is in its disengaged position such that the first hub 240 is rotationally decoupled from the second hub 250. As a result, the actuator 105 is free to rotate, but such rotation is not transmitted to the retraction member 104. Thus, the outer actuator 105 is not operable to retract the bolt 103.

The access controller may move the clutching mechanism 200 from the decoupled state (FIG. 3) to the coupled state (FIG. 4) by transmitting the first signal to the motor 222. The first signal may, for example, be electrical power of a first polarity that causes the motor 222 to rotate the shaft 223 in a first direction. In response to receiving the first signal, the motor 222 rotates the shaft 223 in a first direction, the reduction gear set 226 causes a corresponding rotation of the coil spring 224, and the coil spring 224 urges the wall 230 from its release position (FIG. 3) toward its holding position (FIG. 4). If the lug 260 is not aligned with one of the notches 256, the coil spring 224 stores the mechanical energy needed to drive the wall 230 to the appropriate position. When a notch 256 becomes aligned with the lug 260 (e.g., upon rotation of the actuator 105 by the user), the coil spring 224 releases the energy and drives the wall 230 to the holding position, thereby placing the lug 260 in its engaged position. With the lug 260 in its engaged position, the lug 260 couples the first hub 240 and the second hub 250 for joint rotation. As a result, rotation of the actuator 105 is transmitted to the retraction member 104 such that the actuator 105 is capable of extending and retracting the bolt 103.

The access controller 102 may return the clutching mechanism 200 to the decoupled state by transmitting the second signal to the motor 222. The second signal may, for example, be electrical power of an opposite second polarity that causes the motor 222 to rotate the shaft 223 in a second direction opposite the first direction. In response to receiving the second signal, the motor 222 rotates the shaft 223 in a second direction, the reduction gear set 226 causes a corresponding rotation of the coil spring 224, and the coil spring 224 urges the wall 230 toward the releasing position illustrated in FIG. 3. As the wall 230 reaches the releasing position, the spring 262 drives the lug 260 to its disengaged state, thereby returning the clutching mechanism 200 to the decoupled state. At this stage, the actuator 105 is no longer operable to extend and/or retract the bolt 103.

Figure 5:
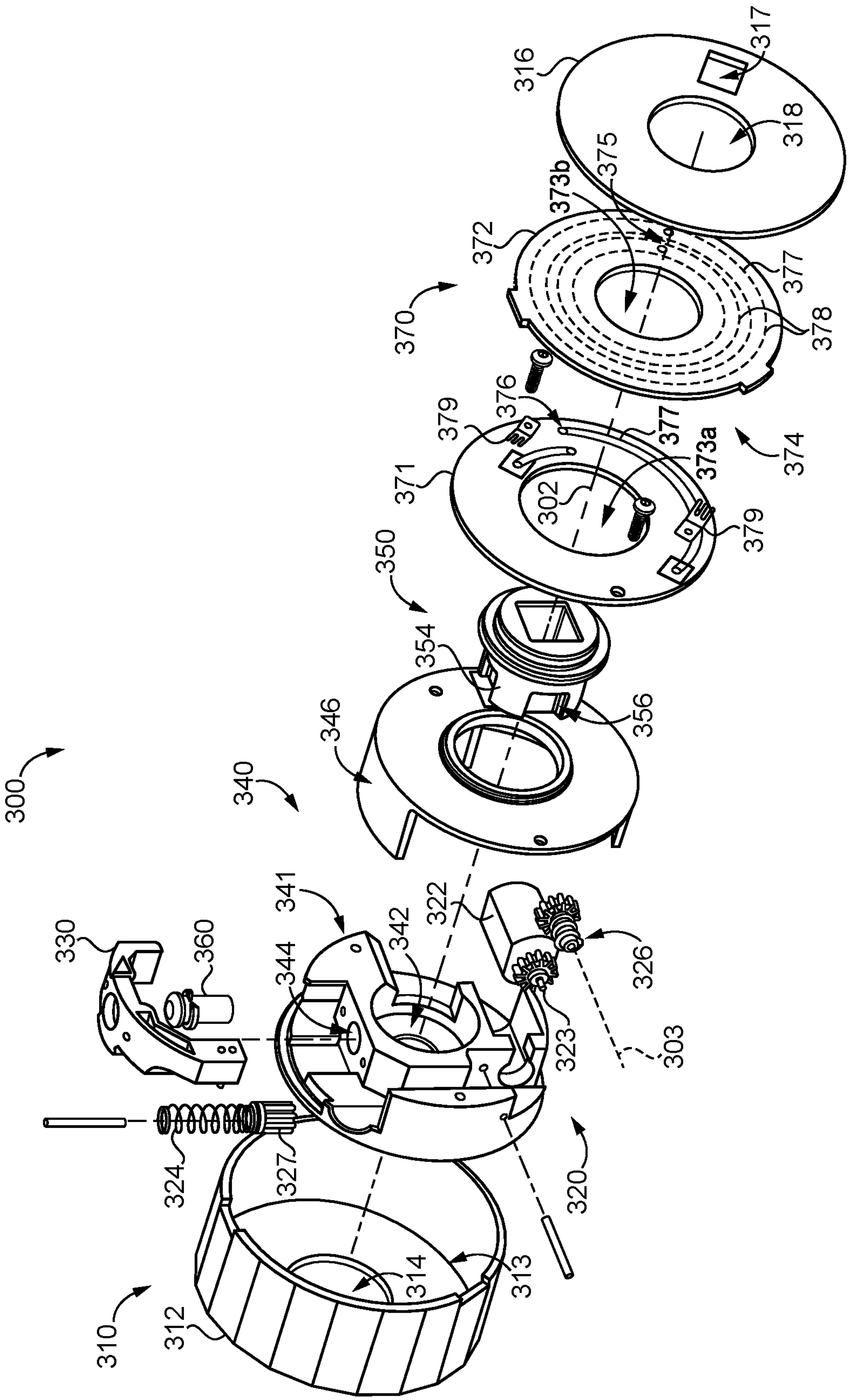
FIG. 5 is an exploded assembly view of a clutch mechanism according to certain embodiments.
Figure 6:
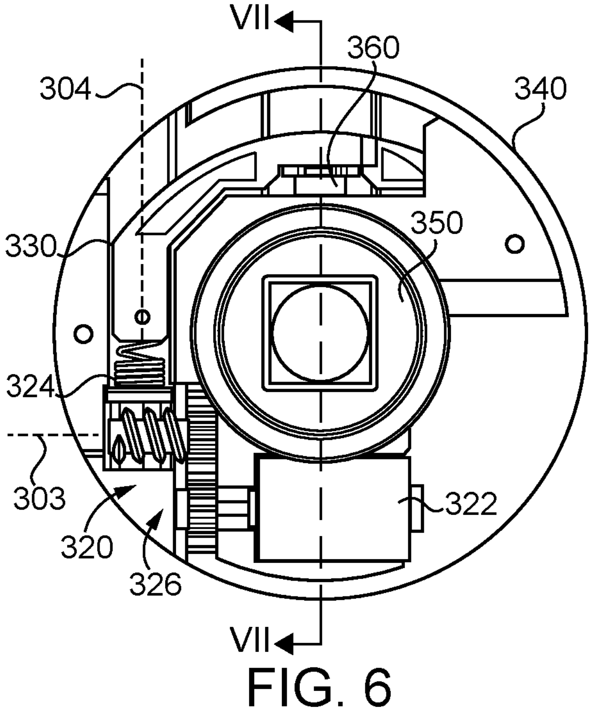
FIG. 6 is a plan view of the clutch mechanism illustrated in FIG. 5 while in an unlocked or coupling state.
Figure 7:
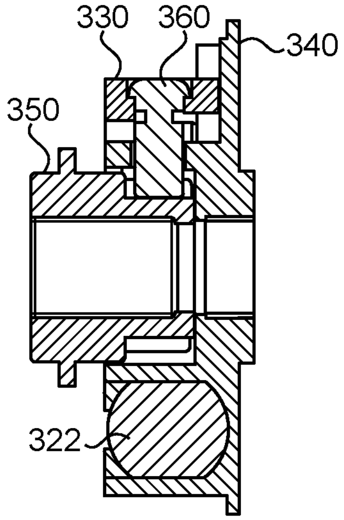
FIG. 7 is a cross-sectional view of the clutch mechanism taken along the line VII-VII illustrated in FIG. 6.
Figure 8:
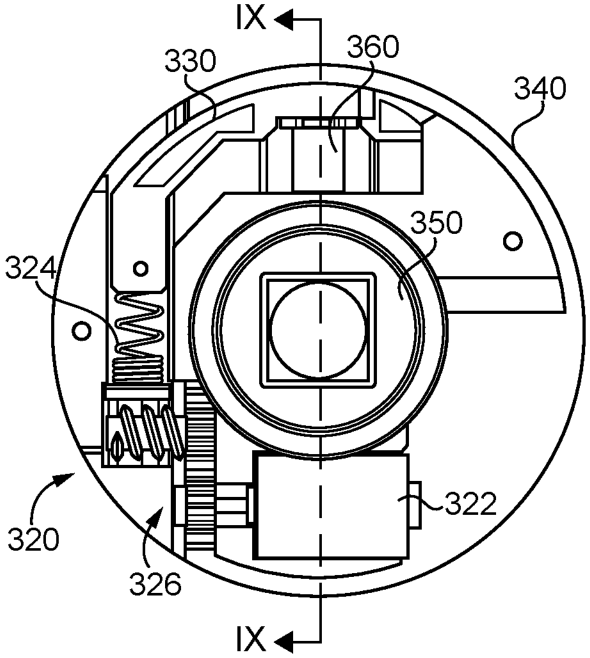
FIG. 8 is a plan view of the clutch mechanism illustrated in FIG. 5 while in a locked or decoupling state.
Figure 9:
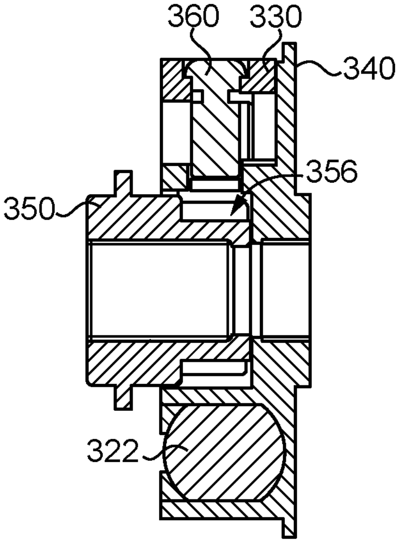
FIG. 9 is a cross-sectional view of the clutch mechanism taken along the line IX-IX illustrated in FIG. 8.
Figure 10:
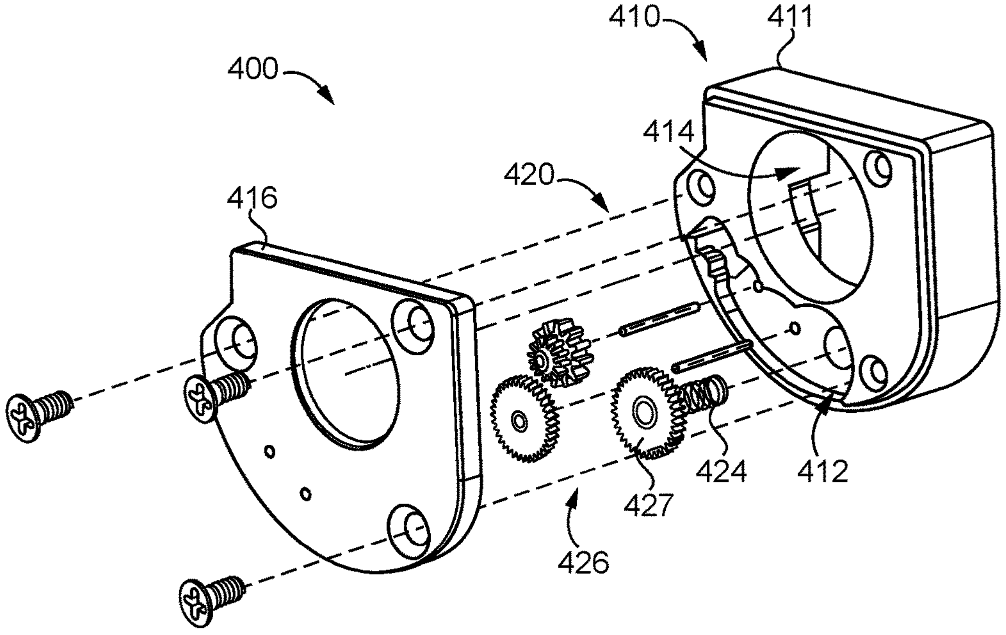
FIGS. 10 and 11 are exploded assembly views of a clutch mechanism according to certain embodiments.
Figure 11:
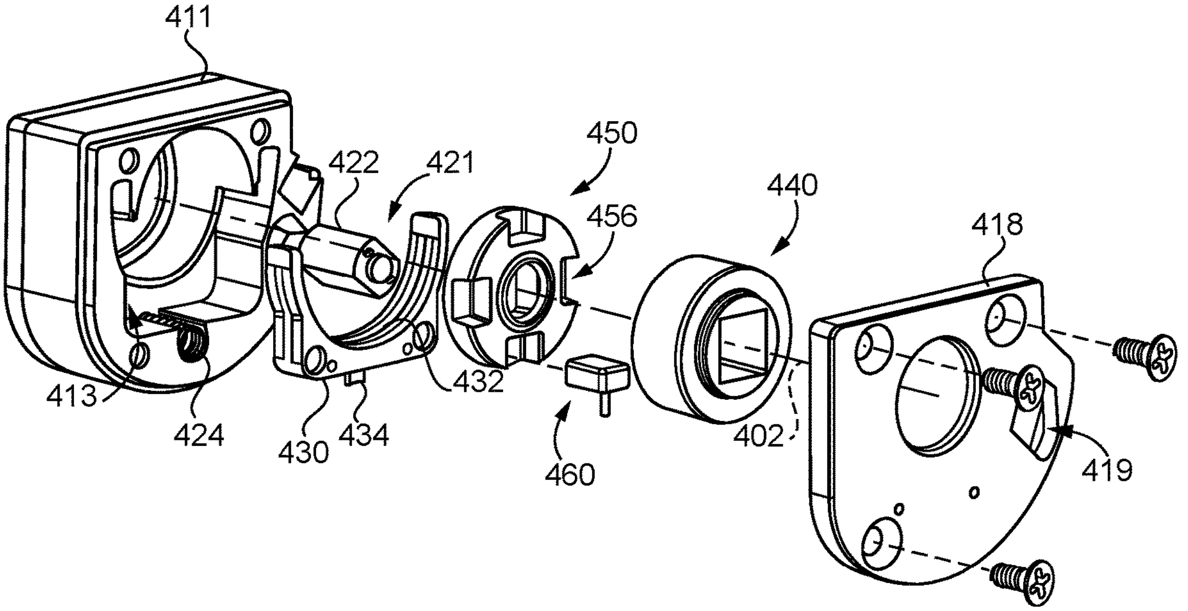
Figure 12:
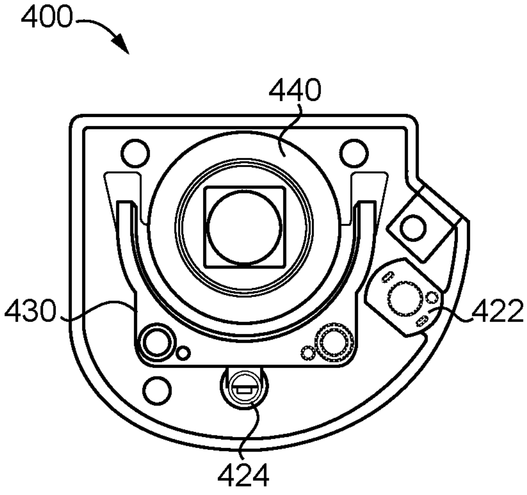
FIGS. 12 and 13 are plan views of the clutch mechanism illustrated in FIGS. 10 and 11.
Figure 13:
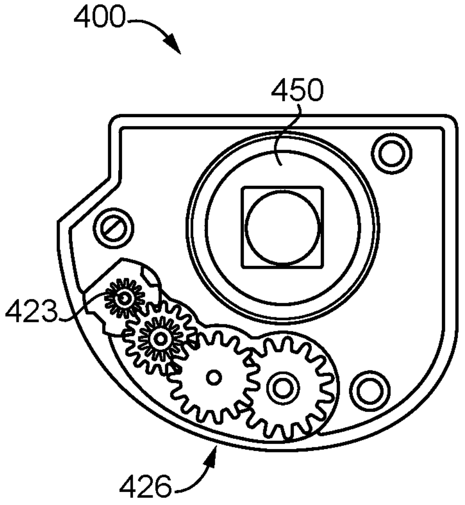

With reference to FIG. 5, illustrated therein is a modular clutching mechanism 300 according to certain embodiments, which is another example of the above-described modular clutching mechanism 150. The clutching mechanism 300 is provided as a modular unit that is self-contained within a case 310, which is configured to be mounted in each of a plurality of different assemblies that can be associated with the clutching mechanism 300. The clutching mechanism 300 generally includes the case 310, a drive assembly 320, a moving wall 330 driven by the drive assembly 320, a first hub 340 rotatably mounted in the case 310, a second hub 350 rotatably within the first hub 340, and a clutching lug 360 operable to selectively couple the hubs 340, 350 for joint rotation. As described herein, the drive assembly 320 is mounted to or within the first hub 340 such that the drive assembly 320 revolves around the rotational axis 302 as the hub 340 rotates relative to the case 310. To facilitate the electrical communication between the drive assembly 320 and the access controller 102 during such rotation, the clutching mechanism 300 further includes a rotary electrical coupling 370.

The case 310 includes a housing 312 defining a chamber 313 connected with a central opening 314, and a cover 316 defining a connector opening 317 and a central opening 318. The housing 312 has a polygonal cross-section that approaches the circular, but which includes a plurality of flats 315 that aid in preventing rotation of the clutching mechanism 300 relative to the housing assembly 101 of the lockset 100 in which it is installed.

The drive assembly 320 generally includes a motor 322 having a motor shaft 323 that is connected to a coil spring 324 via a reduction gear set 326. The reduction gear set 326 includes an input gear 325 mounted to the motor shaft 323, an output gear 327 to which the coil spring 324 is coupled for joint rotation, and one or more intermediate gears connecting the input gear 325 with the output gear 327 such that the output gear 327 rotates at a lower speed than the input gear 325. In the illustrated form, the at least one intermediate gear comprises a worm that rotates about an axis 303 that is parallel to the motor shaft 323 and perpendicular to the rotational axis 302. The worm is engaged with the output gear 327, which rotates about an axis 304 that is perpendicular to both the motor shaft 323 and the rotational axis 302. As a result, the drive assembly 320 is substantially L-shaped, which provides additional space for the mounting of the second hub 350 within the first hub 340.

The moving wall 330 is slidably mounted within the first hub 340, and is engaged with the drive assembly 320 in a manner substantially similar to that described above with reference to the moving wall 230. In the illustrated embodiment, however, the clutching lug 360 is secured to the wall 330 for joint linear movement therewith, thereby eliminating the need for a separate biasing member urging the lug 360 into contact with the wall 330.

The first hub 340 is rotatably mounted in the chamber 313, and includes a base portion 341 and a cover portion 346, which cooperate to define a journal bearing within which the second hub 350 is rotatably mounted. The base portion 341 includes a central opening 342 that partially defines the journal bearing, and a radial opening 344 connected with the main opening 342. The cover portion 346 is coupled with the base portion 341 and aids in retaining the drive assembly 320 and the wall 330 within the first hub 340.

The second hub 350 is received in the central opening 342 and is rotatably supported by the first hub 340. The second hub 350 includes a circular radially outer surface 354 that is interrupted by one or more notches 356, each of which is sized and shaped to receive the clutching lug 360.

The rotary electrical coupling 370 generally includes a rotor 371 mounted for rotation with the first hub 340, and a stator 372 coupled to the housing 312 such that the stator 372 is stationary with respect to the case 310. For example, the stator 372 may include one or more radial tabs, and the rim of the housing 312 may include one or more notches that matingly receive the tabs. The rotary electrical coupling 370 includes a central opening 373*a* that is formed in the rotor 371 and a central opening 373*b* formed in the stator 372, and the second hub 350 extends through or is accessible via the openings 373*a* and 373*b*. Each of the rotor 371 and the stator 372 includes an inner surface and an outer surface, which are defined such that the inner surfaces face one another and are offset from one another along the rotational axis 302.

The rotor 371 and the stator 372 cooperate to form two distinct paths 374 of electrical communication between an input terminal 375 formed on the stator 372 and an output terminal 376 formed on the rotor 371. The input terminal 375 is accessible via the opening 317, the output terminal 376 is electrically connected with the motor 322, and the paths 374 provide lines of electrical communication between the motor 322 and the input connector, which is defined by or electrically connected with the output terminal 376. The rotor 371 and the stator 372 may, for example, be provided in the form of printed circuit boards (PCBs), and the paths 374 may be defined in part by traces 377 on the PCBs. Each of the paths 374 includes an annular trace 378 and a wiper 379. The annular trace 378 is formed on one of the rotor 371 or the stator 372, and the wiper 379 formed on the other of the rotor 371 or the stator 372 and is in contact with corresponding annular trace 378.

With additional reference to FIGS. 6-9, operation of the clutch mechanism 300 initially proceeds substantially along the lines described above with reference to the clutch mechanism 200. More specifically, the access controller 102 transmits a first signal (e.g. electrical power of a first polarity) to the motor 322, which causes the motor 322 to rotate the shaft 323 in a first direction, thereby rotating the coil spring 324 in a corresponding direction. Such rotation of the coil spring 324 urges the wall 330 from its release position (FIGS. 8 and 9) to its holding position (FIGS. 6 and 7), thereby moving the lug 360 to its engaged position and coupling the hubs 340, 350 for joint rotation about the rotational axis.

With the clutch mechanism 300 in its coupling state, rotation of the outer actuator 105 causes a corresponding rotation of the hubs 340, 350 about the rotational axis 302. With the drive assembly 320, wall 330, and lug 360 carried by the first hub 340, such rotation of the hubs 340, 350 causes the drive assembly 320, the wall 330, and the lug 360 to orbit or revolve about the rotational axis 302. Thus, the motor 322 moves relative to the location through which electrical power is supplied to the clutch mechanism 300 (i.e., the input terminal 375). During such travel, however, the motor 322 remains in communication with the access controller 102 via the paths 374 provided by the rotary electrical coupling 370. Where warranted, various components of the clutch mechanism 300 may be formed of a non-conductive material, such as plastic, in order to prevent such components from forming a circuit-shorting path of conductivity between the paths 374 provided by the coupling 370.

When the second signal (e.g., electrical power of a second polarity) is transmitted to the motor 322, the motor 322 rotates the shaft 323 in a second direction, thereby rotating the coil spring 324 in a corresponding direction. Such rotation of the coil spring 324 urges the wall 330 from its holding position (FIGS. 6 and 7) to its release position (FIGS. 8 and 9), thereby moving the lug 360 to its disengaged position and rotationally decoupling the hubs 340, 350 from one another. In this state, the outer actuator 105 is once again inoperable to move the bolt 103.

With reference to FIGS. 10-13, illustrated therein is a modular clutching mechanism 400 according to certain embodiments, which is another example of the above-described modular clutching mechanism 150. The clutching mechanism 400 is provided as a modular unit that is self-contained within a case 410, which is configured to be mounted in each of a plurality of different assemblies that can be associated with the clutching mechanism 400. The clutching mechanism 400 generally includes the case 410, a drive assembly 420, a moving wall 430 driven by the drive assembly 420, a first hub 440 rotatably mounted in the case 410, a second hub 450 rotatably within the first hub 440, and a clutching lug 460 that is mounted to the wall and is operable to selectively couple the hubs 440, 450 for joint rotation.

The case 410 has a central opening 414 defined therethrough, and includes a housing 411, a front cover 416 secured to a front side of the housing 411, and a rear cover 418 secured to a rear side of the housing 411. The front side of the housing 411 defines a first recess 412 in which a portion of the drive assembly 420 is seated, and the rear side of the housing 411 defines a second recess 413 in which the moving wall 430 is slidably received.

The drive assembly 420 generally includes a motor 422 having a motor shaft 423 that is connected to a coil spring 424 via a reduction gear set 426 that is seated in the first recess 412. An electrical connector 421 is connected with terminals of the motor 422 and is accessible via an opening 419 in the rear cover 418. The reduction gear set 426 includes an input gear 425 mounted to the motor shaft 423, an output gear 427 to which the coil spring 424 is coupled for joint rotation, and one or more intermediate gears connecting the input gear 425 with the output gear 427 such that the output gear 427 rotates at a lower speed than the input gear 425. In the illustrated form, the motor 422 is positioned on the rear side of the housing 411, the motor shaft 423 extends forward through the housing 411 to engage the reduction gear set 426, and the coil spring 424 extends rearward through the housing 411 to engage the moving wall 430.

Each of the rotating components of the drive assembly (i.e., the motor shaft 423, the coil spring 424, and the gears of the reduction gear set 426) rotates about a corresponding and respective rotational axis that is parallel to the rotational axis 402 of the hubs 440, 450. With the coil spring 424 rotating about such a parallel rotational axis, the wall 430 and the lug 460 are configured to move parallel to the rotational axis 402 in response to rotation of the spring 424. Thus, unlike the radial movement of the above-described lugs 260, 360, the lug 460 of the current embodiment is mounted for axial movement.

Each of the hubs 440, 450 includes features analogous to those described above with respect the previously-described embodiments, which features are adapted to accommodate axial movement of the lug 460 in lieu of the previously-described radial movement. For example, the notches 456 in the second hub 450 are axial notches that receive the lug 460 when the lug 460 is in a forward engaged position. The first hub 440 likewise includes an axial notch that receives the lug 460 when the lug 460 is in the forward engaged position, and which also receives the lug 460 when the lug 460 is in a rearward disengaged position.

The wall 430 supports the lug 460 and drives the lug 460 between the engaged and disengaged positions in response to rotation of the coil spring 424, which is controlled by the motor 422 in a manner analogous to that described above. When the first hub 440 rotates, the hub 440 carries the lug 460 such that the lug 460 revolves about the rotational axis 402. The arcuate surface 432 of the wall 430 supports the lug 460 during such revolution, thereby maintaining engagement between the lug 460 and the hub 440 or the hubs 440, 450.

Figure 14:
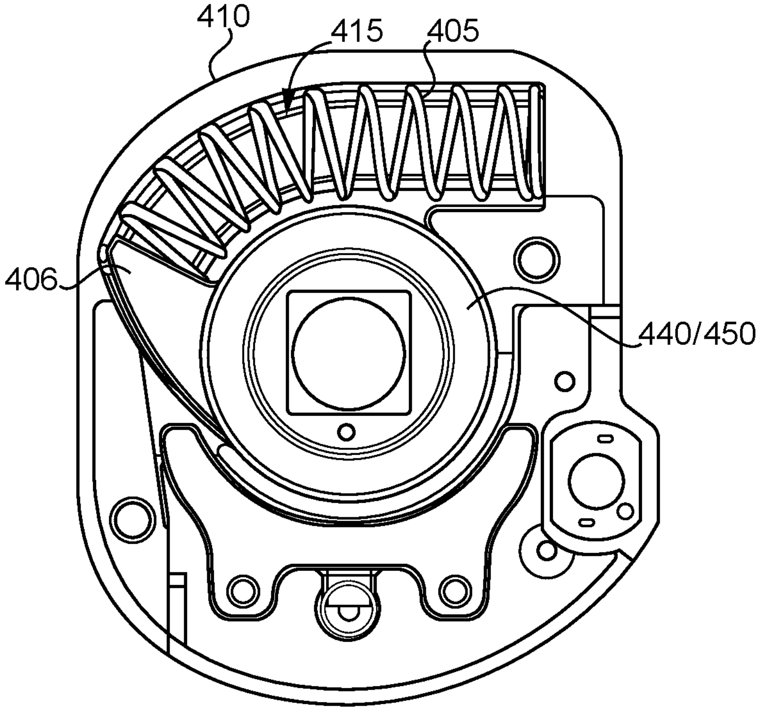
FIG. 14 is a plan view of a modification of the clutch mechanism illustrated in FIGS. 10 and 11.

With additional reference to FIG. 14, it may be desirable in certain circumstances for one or both of the hubs 440, 450 to be biased toward a home position. In such forms, the case 410 may further define a channel 415, and the hub 440/450 may have a radial extension 406 that extends into the channel 415. A spring 405 may be seated in the channel 415 and engaged with the extension 406 such that the hub 440/450 is biased toward a home position.

Figure 15:
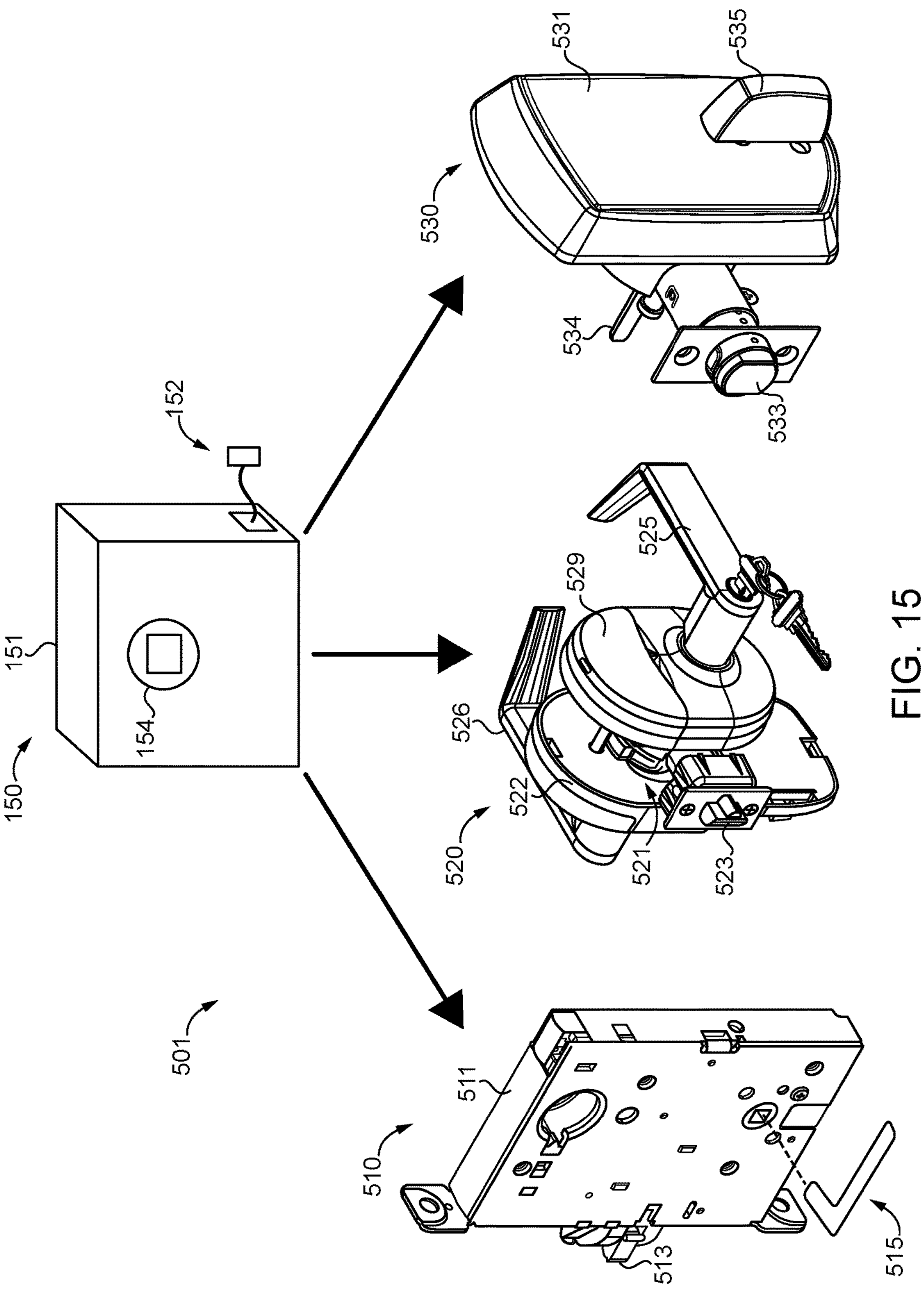
FIG. 15 is a schematic diagram of a system according to certain embodiments.

With reference to FIG. 15, illustrated therein is an electronic lockset line 500 according to certain embodiments. The lockset line 500 includes a plurality of electronic lockset products 501, each corresponding to a different format or configuration of the above-described lockset 500. For example, the lockset line 500 may include a mortise format lockset 510, a cylindrical format lockset 520, and a deadbolt format lockset 530. The elements and features typical of such lockset formats are well known in the art, and need not be discussed in further detail herein. As will be appreciated, the illustrated lockset formats are provided by way of example, and the lockset line 500 may include additional or alternative lockset products 501 of different formats. By way of example, the additional or alternative formats may include a tubular format and/or a remote latching format.

Each of the lockset products 501 is an embodiment of the above-described lockset 100, and includes elements and features corresponding that are designated with similar reference characters. For example, the deadbolt lockset 530 includes an escutcheon 531, a deadbolt 533, a tailpiece 534, and a thumbturn 535, which respectively correspond to the housing assembly 101, bolt 103 retraction member 104, and manual actuator 105 of the lockset 100. Additionally, each of the lockset products 501 includes or is in communication with an access controller corresponding to the access controller 102. For example, the cylindrical lockset 520 includes an access controller 522 mounted proximate the inside actuator 526, and a credential reader 529 mounted proximate the outside actuator 525 is in communication with the access controller 522.

One challenge associated with the development of a lockset line is that a locking mechanism developed for use in one format of lockset may not necessarily be appropriate for use in another format of lockset. For example, a clutching mechanism designed to be accommodated in the relatively large case 511 of a mortise format lockset 510 may be too large to fit in the relatively smaller case 531 of a deadbolt format lockset 530. Even in situations in which the same basic operating principle can be utilized in two or more formats, the components of the locking mechanism often need to be modified or redesigned from one format to the next. In certain circumstances, such as those in which two lockset products of the same format are designed to have different functions, the locking mechanism may need to be redesigned for different lockset products of the same format.

The foregoing difficulties may be alleviated in the lockset line 500, which also includes the clutching mechanism 150. In various forms, the clutching mechanism 150 may be provided as one or more of the clutching mechanisms 200, 300, 400 described hereinabove. Due to the self-contained and modular nature of the clutching mechanism 150, the clutching mechanism 150 can be installed to each of the lockset products 501. Installation may be facilitated by the fact that the such installation can be accomplished without opening the casing 151, as all points of operative connection (i.e., the electrical connector 152, the first hub 154, and the second hub 155) are accessible from outside the casing 151. Installation may further be facilitated in embodiments in which the clutching mechanism 150 is reversible, as the installer can be agnostic as to which of the hubs 154, 155 is coupled to the actuator 105 and which is coupled to the retraction member 104.

As will be appreciated, when the clutch mechanism 150 is installed to any lockset product 501 of the system 500, the operation of the lockset product 501 and the clutch mechanism 150 proceeds along the lines set forth above. As an illustrative example, the clutching mechanism 150 may be provided in the form of the axial clutching mechanism 400. In one configuration, the clutching mechanism 400 may be installed to the mortise format lockset 510, and may selectively enable the outside handle 515 to retract the latchbolt 513 based upon signals received from a remote access controller. In another configuration, the clutching mechanism 400 may be installed to the cylindrical format lockset 520, and may selectively enable the outside handle 525 to retract the latchbolt 523 based upon signals received from the access controller 522, which may be transmitted when an appropriate credential is presented to the credential reader 529. In a third configuration, the clutching mechanism 400 may be installed to the deadbolt format lockset 530, and may selectively enable the thumbturn 535 to retract and extend the deadbolt 533 based upon signals received from an access controller mounted within the housing assembly 531, which may include a credential reader. Due to the modular and self-contained nature of the clutching mechanism 400, adjustment between the three configurations can be achieved without opening the case 410. Those skilled in the art will appreciate that similar functions and features will manifest when the modular clutching mechanism 150 is provided in another form, such as that of the clutching mechanism 200 or the clutching mechanism 300.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:

a lock apparatus, comprising:

a housing assembly;

a manual actuator mounted for rotation relative to the housing assembly; and a bolt mechanism comprising a bolt; and a clutch assembly, comprising:

a casing configured for mounting in the housing assembly;

a first hub rotatably mounted in the casing and operable to be rotated by the manual actuator; and a second hub rotatably mounted in the casing and operable to move the bolt when the second hub is rotated;

wherein the clutch assembly has an engaged state in which the first hub is rotationally coupled with the second hub such that the manual actuator is operable to move the bolt;

wherein the clutch assembly has a disengaged state in which the first hub is rotationally decoupled from the second hub such that the manual actuator is inoperable to move the bolt; and wherein the clutch assembly is operable to be installed to the lock apparatus without opening the casing.

2. The system of claim 1, further comprising a clutch lug operable to selectively couple the first hub and the second hub.

3. The system of claim 2, wherein the first hub comprises a plurality of first recesses, each of the plurality of first recesses operable to receive a first portion of the clutch lug; and wherein the second hub comprises at least one second recess, each of the at least one second recess operable to receive a second portion of the clutch lug.

4. The system of claim 1, wherein the clutch assembly further comprises a drive assembly operable to transition the clutch assembly between the engaged state and the disengaged state.

5. The system of claim 4, wherein the drive assembly comprises an electrically-operable driver.

6. The system of claim 5, wherein the clutch assembly further comprises an electrical connector accessible from outside the casing.

7. The system of claim 6, wherein the lock apparatus further comprises an access controller operable to be connected with the electrically-operable driver via the electrical connector.

8. A system, comprising:

a lock apparatus, comprising:

a housing assembly;

a manual actuator mounted for rotation relative to the housing assembly; and a bolt mechanism comprising a bolt; and a clutch assembly, comprising:

a casing configured for mounting in the housing assembly;

a first hub rotatably mounted in the casing; and a second hub rotatably mounted in the casing;

wherein the clutch assembly is operable to be installed to the lock apparatus in a first orientation without opening the casing;

wherein, with the clutch assembly installed to the lock apparatus in the first orientation, the first hub is operable to be rotated by the manual actuator, and the bolt mechanism is configured to retract the bolt in response to rotation of the second hub;

wherein the clutch assembly has an engaged state in which the first hub is rotationally coupled with the second hub such that the manual actuator is operable to move the bolt; and wherein the clutch assembly has a disengaged state in which the first hub is rotationally decoupled from the second hub such that the manual actuator is inoperable to move the bolt.

9. The system of claim 8, wherein the clutch assembly is operable to be installed to the lock apparatus in a second orientation without opening the casing; and wherein, with the clutch assembly installed to the lock apparatus in the first second orientation, the second hub is operable to be rotated by the manual actuator, and the bolt mechanism is configured to retract the bolt in response to rotation of the first hub.

10. The system of claim 9, wherein the first orientation and the second orientation are opposite one another.

11. The system of claim 8, wherein the clutch assembly further comprises a drive assembly operable to transition the clutch assembly between the engaged state and the disengaged state.

12. The system of claim 11, wherein the drive assembly comprises an electrically-operable driver.

13. The system of claim 12, further comprising an electrical connector accessible from outside the casing.

14. The system of claim 8, wherein the clutch assembly further comprises:

a clutching lug operable to selectively couple the first hub and the second hub; and an electrical driver operable to move the clutching lug between an engaged position and a disengaged position.

15. A method, comprising:

installing a clutch module to a lock apparatus comprising a housing assembly, a manual actuator, and a bolt mechanism, wherein the clutch module comprises a casing, a first hub rotatably mounted in the casing, and a second hub rotatably mounted in the casing, wherein installing the clutch module is performed without opening the casing and comprises:

engaging the first hub with the manual actuator such that the manual actuator is operable to rotate the first hub; and engaging the second hub with the bolt mechanism such that the bolt mechanism is configured to move a bolt in response to rotation of the second hub;

selectively operating the clutch module in an engaged state in which the first hub is rotationally coupled with the second hub such that the manual actuator is operable to move the bolt; and selectively operating the clutch module in a disengaged state in which the first hub is rotationally decoupled from the second hub such that the manual actuator is inoperable to move the bolt.

16. The method of claim 15, further comprising selectively transitioning the clutch module between the engaged state and the disengaged state.

17. The method of claim 16, wherein selectively transitioning the clutch module comprises operating an electronic driver to move the clutch module between the engaged state and the disengaged state.

18. The method of claim 17, wherein installing the clutch module to the lock apparatus further comprises connecting an electrical connector of the clutch module with a control assembly of the lock apparatus.

19. The method of claim 15, further comprising reversing an orientation of the clutch module such that the first hub is engaged with the bolt mechanism and the second hub is engaged with the manual actuator.

20. The method of claim 15, wherein the first lock apparatus is a first lock apparatus of a first format;

wherein the method further comprises removing the clutch module from the first lock apparatus and installing the clutch module to a second lock apparatus;

wherein the second lock apparatus is of a second format different from the first format; and wherein at least one of the first format or the second format is selected from a mortise format, a deadbolt format, and a cylindrical format.

* * * * *